United States Patent [19]
Blom

[11] Patent Number: 4,759,634
[45] Date of Patent: Jul. 26, 1988

[54] BEVERAGE PREPARING AND DISPENSING APPARATUS

[75] Inventor: Erik Blom, Mariestad, Sweden

[73] Assignee: Jede-Automater AB, Mariestad, Sweden

[21] Appl. No.: 14,054

[22] PCT Filed: May 21, 1986

[86] PCT No.: PCT/SE86/00236
§ 371 Date: Jan. 20, 1987
§ 102(e) Date: Jan. 20, 1987

[87] PCT Pub. No.: WO86/06942
PCT Pub. Date: Dec. 4, 1986

[30] Foreign Application Priority Data
May 23, 1985 [SE] Sweden .................... 8502546

[51] Int. Cl.⁴ .............................................. B01F 5/04
[52] U.S. Cl. ...................................... 366/167; 141/279; 366/165
[58] Field of Search ............... 366/150, 154, 165, 167, 366/168, 169, 173, 241, 348, 349; 141/279

[56] References Cited

U.S. PATENT DOCUMENTS

| | | | |
|---|---|---|---|
| 3,398,935 | 8/1968 | Livesey | 366/165 |
| 4,302,113 | 11/1981 | Rumfola | 366/150 |
| 4,495,086 | 1/1985 | Hiroshima | 366/165 |

FOREIGN PATENT DOCUMENTS 0060645 3/1982 European Pat. Off. .
0151500 2/1985 European Pat. Off. .

*Primary Examiner*—Robert W. Jenkins
*Attorney, Agent, or Firm*—Hayes, Davis & Soloway

[57] ABSTRACT

Beverage preparing and dispensing apparatus, in which powdered ingredients are pre-placed on the bottom of a drinking vessel (14). The feed conduit (32,34) through which liquid is dispensed is caused to move as the liquid is dispensed, so as to agitate the ingredient and facilitate their dissolution and/or suspension in the liquid. Thus, a moving jet of liquid (68,69') is caused to sweep over the bottom of the drinking vessel in a substantially circular path, without leaving dead zones in which the ingredients are unaffected by the jet and thus might remain undissolved on the bottom of the vessel.

8 Claims, 2 Drawing Sheets

BEVERAGE PREPARING AND DISPENSING APPARATUS

The present invention relates to a beverage preparing and dispensing apparatus.

The invention has particular application in the preparation of beverages in which powdered ingredients are either dissolved or suspended in a liquid. Examples of such powdered ingredients are sugar, powdered coffee and tea, dry milk, powdered cream or creme substitute, cocoa, and various powders for the preparation of soft drinks. The powder may be pre-packed in a disposable drinking vessel, e.g. a plastic beaker. A variety of powders can also be dispensed or apportioned into the drinking vessels in measured quantities from a so-called "automatic powder dispenser", or in some other way. The liquid used is normally hot or cold water, although it may also be milk or some other liquid.

One frequent problem encountered with known apparatus for preparing beverages from powdered ingredients is that the powder does not dissolve properly or pass into suspension in the manner desired. This is because the liquid exiting from the apparatus solely meets and stirs the powder within a part-zone on the bottom of the drinking vessel, while other part-zones on the bottom of the vessel remain unaffected, so that the powder present in these other part-zones is essentially undistubed, these part-zones being referred to as "dead zones". Certain powders also tend to stick firmly to the bottom of the drinking vessel, therewith also making it difficult to stir-up the powder with a spoon after the beverage has been dispensed. This means in practice that it is almost always necessary to stir beverages with a spoon when using the prior known apparatus for preparing and dispensing beverages comprising powdered ingredients. This naturally increases the cost of the beverages, this extra cost being in the form of the additional expense of providing and handling spoons or like devices, over and above the unavoidable costs of the raw ingredients and the plastic beakers.

Consequently, the object of the present invention is to provide a beverage preparing and dispensing apparatus of the aforedescribed kind, in which the dispensed liquid stirs-up and disperses all of the powdered ingredient present in a drinking vessel, immediately upon being dispensed thereinto.

To this end the invention is mainly characterized as a beverage dispensing apparatus in which the outlet portion of the feed conduit is arranged to be moved during the dispensing operation in a manner to agitate and mix the ingredients.

In order to achieve this, at least the outlet portion of the feed conduit is arranged to follow a substantially circular path and/or the outlet or feed channel of the outlet portion is arranged to move along an imaginary, substantially conical surface.

It is essential to the function of the apparatus that the feed conduit is in motion at the latest when liquid begins to leave the exit orifice of the feed conduit. To this end, the feed conduit is conveniently arranged to be set in motion at the same time as the valve is opened for apportioning a liquid flow to the drinking vessel. Preferably, the feed conduit is kept in motion for at least as long as the valve is kept open. However, should the aforesaid motion commence before liquid begins to run into the drinking vessel, or ceases before the last of the apportioned liquid runs into the vessel, there will be no deleterious affect on the stirring function of the apparatus to dissolve and disperse powdered beverage ingredients. The essential factor is that the powder is effectively agitated during the first second of a filling or dispensing sequence. At this point the liquid has reached a level in the drinking vessel at which the stirring or agitating effect is greatly reduced.

Thus, the liquid is dispensed in a directed jet which describes an approximate circular movement path. This causes all the powdered substance on the bottom of the drinking vessel to swirl-up in the liquid dispensed thereinto. At the same time, all the liquid present in the drinking vessel is set into motion. The result is thus the same as that achieved when stirring the beverage with a spoon. This swirling motion in the drinking vessel also contributes towards dissolving and/or suspending the powdered beverage ingredients.

In order to fill a drinking vessel during a stirring or agitating sequence, the aforesaid motion of the feed conduit and the valve is steered by a control and regulating unit, which preferably incorporates a timing device. The exit end of the feed conduit preferably moves at a speed of about 120–130 r.p.m., in order to provide vigorous and rapid agitation at the beginning of a dispensing sequence, this agitation being sufficient to achieve the aforesaid effect. The valve is preferably held open for a period of about 2–3 seconds, which corresponds to 4–7 turns of the outer end portion of the feed conduit at the aforesaid rotational speed. The valve also includes a throttle means for regulating the quantity of liquid dispensed during the time the valve is open. Thus, the quantity of liquid dispensed can be adjusted by varying the time for which the valve is kept open, with the aid of the timer, and by altering the setting of the throttle means in the device. The drinking vessel is relatively unstable when resting on the bottom support plate or tray during the initial stage of a beverage dispensing operation. If the jet of liquid strikes the wall of the vessel, the vessel is liable to topple over. This situation can be avoided by providing means for supporting and steadying the outer wall of the vessel.

In accordance with the invention, this is preferably effected with the aid of a raised part of a support stirrup which lies against a rearward part of the outer wall of the vessel, as seen by the user of the apparatus or machine. In this regard, movement of the feed conduit is coordinated with the opening of the valve, so that in the initial stage of a dispensing operation the incoming jet of liquid strikes adjacent to or on that part of the vessel wall which lies against the aforesaid raised part of the support stirrup. At the same time, the bottom region of the forward part of the drinking vessel, as seen by the user, is advantageously held by two mutually converging legs of the support stirrup. In order to ensure that the jet will always impinge upon the wall of the vessel at or adjacent the location of the raised part of the support stirrup in the initial dispensing stage, movement of the feed conduit is arranged to cease when the feed conduit has reached a given, pre-determined position. This is effected by arranging the feed-conduit drive-means to stop in a given position. This drive means may be provided with a motor which is arranged to stop in only a given position, similar to the motor of vehicle windscreen wipers. Its movements will therewith continue after the valve arrangement has closed.

The supply of liquid need not necessarily be controlled by a timer, or be solely controlled thereby. The apparatus according to the invention may therefore be provided with a button for "extra liquid". This button is used for topping-up the level of liquid in the drinking vessel. It is not necesary for the jet of liquid to describe the aforesaid movement path when topping-up the drinking vessel, since the powdered ingredient has already been mixed with the liquid dispensed during the main part of the dispensing operation. Naturally, the movement can also be continued subsequent to completing a topping-up operation, as before described. The drinking vessel may also be filled with liquid with the aid of a button which is held pressed. In this case the feed-conduit drivemeans is suitably provided with an arrangement of the aforedescribed kind for stopping movement in a given position subsequent to closing the valve.

In an apparatus according to the invention a movable jet of liquid directed into a drinking vessel for the purpose of stirring or agitating the powdered beverage ingredients present therein can be achieved with many different forms of arrangements. In accordance with one preferred embodiment such an arrangement comprises a motor-driven arm with means for embracing the outlet end-portion of the feed conduit. The arm is pivotally journalled and axially movable at its centre and is eccentrically attached to a driven rotor. The embracing (dogging) means may have the form of a ring or the like surrounding the outermost part of the outlet end-portion of the feed conduit whereby the outlet end and its associated outlet channel is caused to move along an approximately circular path.

According to a further embodiment of the invention, movement of the feed conduit is accomplished by means of a stationarily mounted, rotatably driven dogging means provided with an eccentric bearing aperture for the feed conduit. The drive can be achieved, for example, with the aid of teeth provided on the periphery of the dogging means, or the dogging means may alternatively have the form of a cable pulley.

With a dogging means of this latter kind, it is possible to mount a rigid feed conduit from the valve in the dogging means. In this case, the valve is held firmly by a pivot arm in the apparatus housing and is connected to the liquid source by means of a flexible supply conduit.

A further embodiment of the invention is characterized by an outlet part in the form of a ball or disc which can be rotated by a drive means and which is provided with an eccentrically located and/or obliquely directed outlet aperture, sealingly connected to the feed conduit 32 or the valve 30. The exiting jet of liquid is guided far more accurately with an arrangement of this construction than with an arrangement incorporating a flexible feed conduit whose outlet portion is influenced by dogging means. Manufacturing costs, on the other hand, are higher.

A preferred embodiment of the invention will now be described with reference to the accompanying drawing, in which FIG. 1 is a cut-away partial side view of an apparatus according to the invention for preparing and dispensing beverages;

Figure 1:
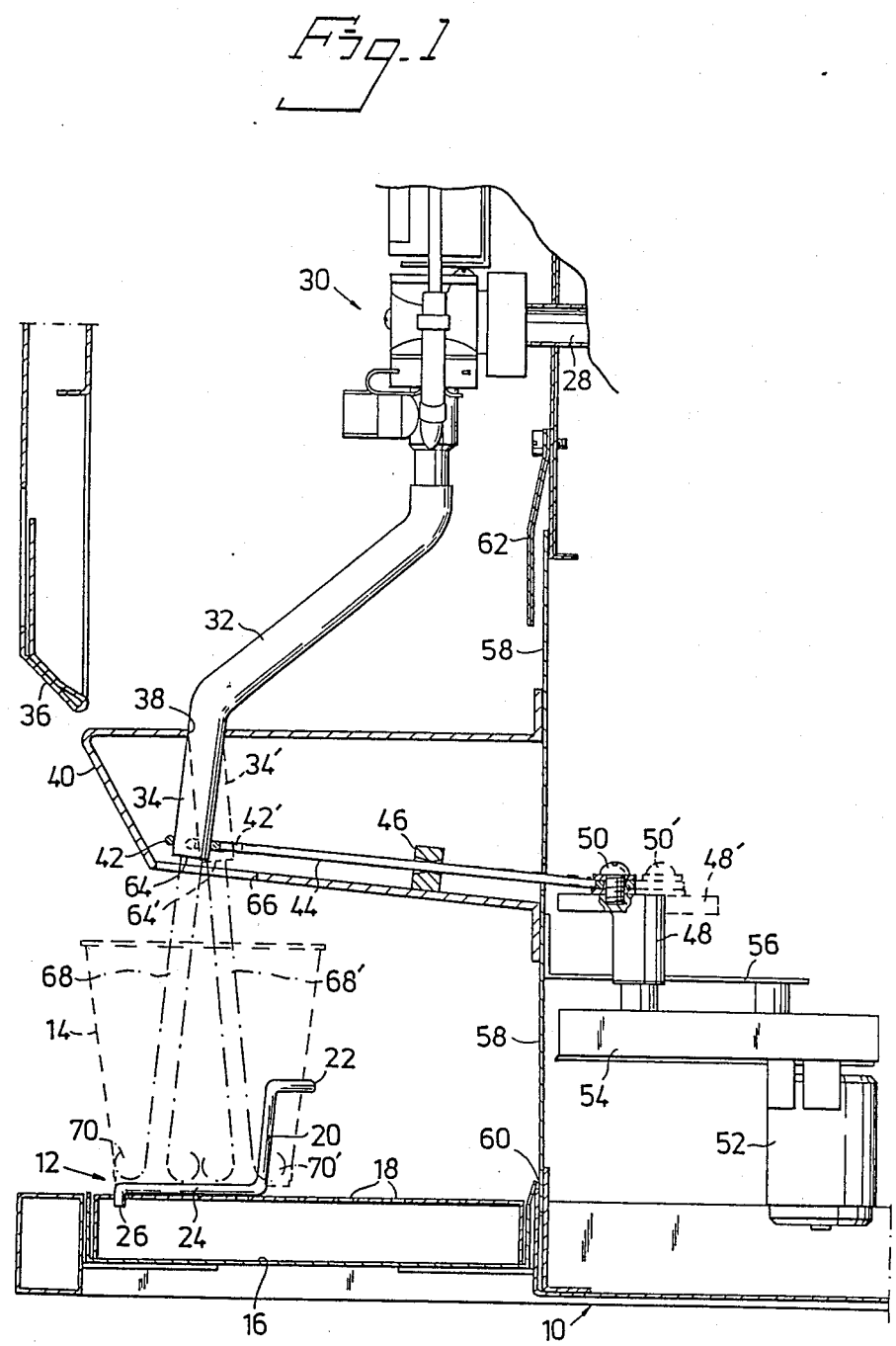

In FIG. 1 there is illustrated a beverage preparing and dispensing apparatus comprising a housing 10 which incorporates a platform 12 upon which a drinking vessel 14 is intended to rest. The drinking vessel is placed on a drip tray 16 having a perforated upper part 18 and a vessel support stirrup 20. The stirrup 20 has a rearwardly located, curved raised part 22 which forms a stop means for an inserted drinking vessel, e.g. a plastic beaker 14, and which prevents the beaker from toppling during a dispensing or apportioning operation. The support stirrup also presents two legs 24 which mutually converge at the ends thereof and which are terminated with downwardly extending latching end-portions 26. The side legs 24 of the stirrup firmly embrace a beaker 14 and hold the same in position during a beverage dispensing operation.

When dispensing beverage into a drinking vessel, liquid is taken from a liquid source (not shown), preferably in the form of a reservoir embodied in the apparatus, and passed through a supply or inflow conduit 28 to a solenoid valve 30 which controls the flow of liquid, and from there to the outlet portion 34 of a feed conduit 32. The solenoid valve and the feed conduit are encapsulated in a surrounding front casing 36.

The feed conduit is made of a flexible material, for example a plastic hose or pipe, and is mounted upstream of the outlet portion 34 in an aperture 38 located in a bracket 40 attached to the housing 10. The size of the aperture 38 is suitably slightly smaller than the external dimensions of the feed conduit 32, so as to hold the feed conduit 32 against movement in its axial direction. the outlet portion 34 is embraced in the proximity of its outlet end by a ring 42 located on an auxiliary arm 44. The arm is journalled on a centre bearing 46 for movement in both an axial and a lateral direction. The other end of the arm is journalled eccentrically on a rotor 48 by means of a screw 50. The rotor 48 extends from the gear box 54 of a motor 50. The motor 52 and associated transmission or gear box 54 is attached to a detachable front panel 58 on the housing 10, via a bracket structure 56. The aforementioned bracket 40 is also attached to the front panel. The front panel 58 is held to the housing 10 by a channel 60 located at the bottom of the housing structure, and an attachment plate 62 located at the top of said structure. The front panel is also secured against sideways movement with the aid of positioning devices not shown. This panel arrangement enables the panel 58 to be readily removed, together with the components affixed thereto, for inspection and servicing purposes. The front casing 36 is also detachable.

The apparatus according to the invention operates in the following manner. The solenoid valve 30 and the electric motor 52 are connected electrically in parallel and begin to function simultaneously. When the current is made, or switched on, the solenoid valve 40 is opened and the rotor 48 begins to rotate at the same time. The ring 42 therewith describes an approximate circular movement path, dogging or entraining therewith the outlet portion 34. A liquid jet 68 exiting from the exit orifice 64 of the outlet portion will therewith move over a substantially conical surface. Alternative extremity positions of the various movement paths are illustrated in broker-line contours referenced 34', 48', 50', 64' and 68'. In the region of impact of the jets 68,68' on the bottom of the beaker 14, so-called vortices 70, 70', or like turbulences, are formed which result in effective suspension and dissolution of powdered ingredient in the vicinity thereof. Because this point of impact or impingement is caused to move quickly over the whole of the bottom area of the beaker, the occurrence of the aforesaid "dead zones" containing undissolved or non-suspended powder is effectively prevented.

Figure 2:
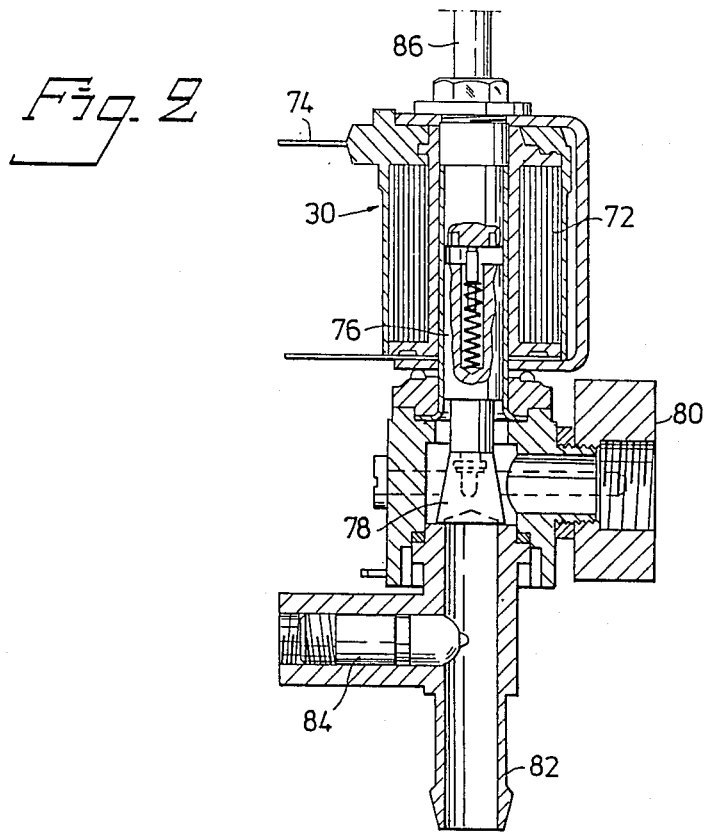
FIG. 2 is a cut-away view of a solenoid valve for interrupting the flow of liquid in the apparatus illustrated in FIG. 1.

FIG. 2 illustrates schematically the main components of a solenoid valve 30 used in accordance with the invention. The solenoid valve comprises a coil 72 with electrical-current connections 74 (only one is shown). When the current is switched on, the coil or winding 72 opens a spring-biassed plunger 76 provided with a rubber diaphragm 78 which blocks the through passage of the valve. This throughflow passage comprises an inlet-pipe connector 80 with connecting elements, and an outlet-pipe connector 82. The outlet-pipe connector 82 incorporates therein a throttle valve 84 which regulates the rate of flow of the liquid flowing through the valve. The throttle valve may conveniently comprise a screw provided with an hexagonal recess for a hexagonal spanner (allen key). The solenoid valve also incorporates an air ventilating valve 86.

Figure 3:
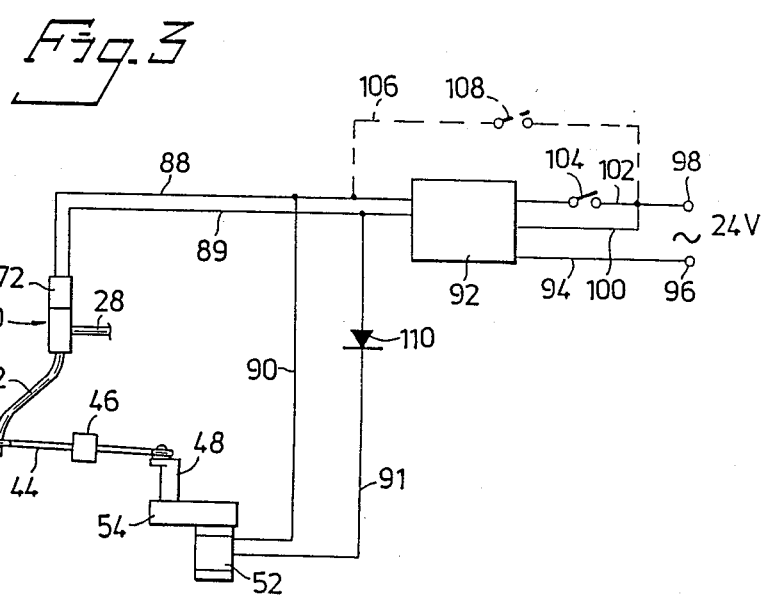
FIG. 3 illustrates a principle circuit diagram for the apparatus of FIGS. 1 and 2.

FIG. 3 illustrates schematically an electric circuit diagram for an apparatus according to the invention. Only the movable components are illustrated, these components being identified by the same references as those used in FIG. 1. The solenoid coil 72 is connected to a control and regulating unit 92 incorporating a timing device, by means of conductors 88,89. The motor 52 is connected to the control and regulating unit 92, in parallel with the solenoid coil 72, via conductors 90,91. The control unit 92 is connected to the one terminal 96 of a 24 volt alternating current source, via a conductor 94. The other terminal 98 is connected to the control unit partly through a direct conductor 100 and partly through a conductor 102 incorporating a switch 104 of the kind actuated by a spring-biassed press button. A conductor 106 incorporating a spring-biassed press button switch 108 may also be connected to the terminal 98 with conductors 88,90 in parallel with the control unit 92. Finally, the conductor 91 may have incorporated therein a rectifier 110, in the event that the motor 52 is a d.c. motor.

The following events take place when using the apparatus. When the switch 104 is pressed down, the timer is started and opens the solenoid valve 30, and the motor 52 is started. A dispensing or filling sequence is therewith initiated, as described above, and fully terminated. When a pre-set time-period has passed, the timer produces a pulse for closing the solenoid valve and stopping the motor 52. In this regard, motion of the motor can continue until a pre-set stop position is reached. When the valve 30 has closed and the motor 52 has stopped, a new dispensing sequence can be started by renewed activation of the switch 104. Additional liquid can be obtained, if desired, by activating the switch 108. Liquid will then be released by the valve for as long as the switch 108 is activated.

The apparatus is not dependent for its operation on the inclusion of a timer. An apparatus according to the invention is then arranged simultaneously to open the liquid supply valve and start the drive means for moving the feed conduit. The valve is open and the feed pipe is in motion only for as long as the switch 104 is activated. Movement of the feed conduit may also continue in this case, until a pre-determined stop position is reached.

It is beneficial for movement of the feed conduit to continue subsequent to closing the valve, since it takes a certain amount of time for all of the apportioned liquid to exit through the feed conduit. For this reason an advantage is gained when movement of the feed conduit is always continued, with the aid of the control and regulating unit 92, after the valve has closed, irrespective of the position of the feed conduit in relation to a desired stop position.

The invention is not restricted to the illustrated and described embodiment, since modifications can be made without deviating from the scope of the following claims.

I claim:

1. Apparatus for preparing and dispensing beverages comprising, powdered or granulated ingredients, and a liquid, said apparatus comprising a housing (10); a supply conduit (28) for said liquid; a valve arrangement (30) controlled by a control unit to regulate the liquid supply (92, 104 108); a feed conduit (32, 34) of a flexible material for delivering liquid from the valve arrangement to a drinking vessel (14) containing said ingredients, characterized in that an outlet portion (34) of the feed conduit (32) is arranged to be moved, during the liquid dispensing operation in a manner to agitate the beverage ingredients present in the drinking vessel and mix said ingredients with the dispensed liquid apportioned to said vessel, by means of an arm (44) driven by a motor (48, 52, 54) and having means (42) for engaging the outlet portion (34) of the feed conduit (32) to flex the feed conduit to move said outlet portion to produce said agitation.

2. Apparatus according to claim 1, characterized in that the feed conduit (32) is held at least substantially firmly at an intermediate section thereof in an aperture (38) of a bracket structure or the like (40), so as to restrict the movability of the feed conduit (32) to its outlet portion (34).

3. Apparatus according to claim 2 characterized in that said arm (44) is journalled eccentrically and an output rotor (48) of said motor and in journalled between the rotor (48) and the engaging means (42) whereby the outlet portion (34) of the feed conduit (32) describes a substantially circular path.

4. Apparatus according to claim 1 characterized in that means are provided to energize said motor to set the outlet portion (34) of the feed conduit (32) in motion at the same time as the valve arrangement (30) is opened for dispensing liquid to the drinking vessel (14).

5. Apparatus according to claim 1 characterized by a control and regulating unit (92) for controlling the movement of the outlet portion (34) of the feed conduit (32) and of the valve (30); said unit (92) preferably including a timing device.

6. Apparatus according to claim 1 characterized in that the outlet portion (34) of the feed conduit (32) moves at a speed of about 120–130 r.p.m. and/or that the dispensing time, i.e. the valve-open time, is about 2–3 seconds or 4–7 r.p.m., or that the valve includes a throttle means (84) for controlling the amount of liquid dispensed during said open-time.

7. Apparatus according to claim 1 characterized in that the liquid is arranged to be dispensed in the form of a liquid jet (68, 68') which in an initial stage impinges adjacent to or on a part of the wall of the drinking vessel located in abutment with a raised part (22) of a support stirrup (20), and/or that movement of the outlet portion (34) of the feed conduit (32) is arranged to cease when a given, pre-determined position is reached.

8. Apparatus according to claim 1 characterized by an outlet part in the form of a ball or disc provided with an eccentrically located and/or obliquely directed outlet aperture and sealingly connected to the feed conduit (32) or the valve (30), said ball or disc being able to be rotated with the aid of drive means.

* * * * *